US006730258B1

(12) United States Patent
Ohtake et al.

(10) Patent No.: US 6,730,258 B1
(45) Date of Patent: May 4, 2004

(54) METHOD OF MANUFACTURING WINDOWS HAVING AN INTEGRAL HOLLOW BODY FRAME MEMBER

(75) Inventors: Shinichi Ohtake, Yokohama (JP); Tatsuya Tamura, Yokohama (JP)

(73) Assignee: Hashimoto Forming Industry Co., Ltd., Yokohama (JP)

( * ) Notice: Subject to any disclaimer, the term of this patent is extended or adjusted under 35 U.S.C. 154(b) by 1,826 days.

(21) Appl. No.: 08/326,806

(22) Filed: Oct. 19, 1994

Related U.S. Application Data

(63) Continuation of application No. 08/047,026, filed on Apr. 16, 1993, which is a division of application No. 07/758,469, filed on Sep. 6, 1991, which is a continuation of application No. 07/442,627, filed on Nov. 29, 1989.

(30) Foreign Application Priority Data

Nov. 29, 1988 (JP) ............................................ 63-301665

(51) Int. Cl.[7] .............................................. B29C 49/20
(52) U.S. Cl. ....................... 264/513; 264/516; 264/572; 264/328.12
(58) Field of Search ................................ 264/511, 512, 264/513, 516, 572, 328.12

(56) References Cited

U.S. PATENT DOCUMENTS

| | | |
|---|---|---|
| 1,546,764 A | 7/1925 | Voit |
| 2,583,343 A | 1/1952 | Rodman |
| 2,667,951 A | 2/1954 | Gall |
| 2,700,196 A | 1/1955 | Panhard |
| 2,825,941 A | 3/1958 | Lux et al. |
| 3,363,390 A * | 1/1968 | Crane et al. ............... 52/823 X |
| 4,001,974 A | 1/1977 | Wright |
| 4,072,340 A | 2/1978 | Morgan |
| 4,101,617 A * | 7/1978 | Friederich .................... 264/93 |

(List continued on next page.)

FOREIGN PATENT DOCUMENTS

| | | | | |
|---|---|---|---|---|
| DE | 2165196 | * | 7/1973 | ................. 296/201 |
| DE | 2825926 | * | 1/1980 | ................. 52/716 |
| DE | 3504907 | | 8/1986 | |

(List continued on next page.)

OTHER PUBLICATIONS

Machine Design, vol. 54, No. 28, Dec. 1982, Cleveland US pp. 99–102; Donald D. Reger: "The Best Of Two Worlds In Plastics Processing".
"Plastics", vol. 39, No. 10, pp. 83–87 (Oct. 1, 1988).
"Introduction to Plastic Molds", 5th Ed., pp. 35–37 (Apr. 15, 1986).

Primary Examiner—Mark Eashoo
(74) Attorney, Agent, or Firm—Oliff & Berridge, PLC

(57) ABSTRACT

A window for automobiles or the like, including a frame member which is composed of a thermoplastic synthetic resin material and formed integrally with a window plate. The frame member includes a substantially U-shaped cross-sectional portion formed of lip and web sections which are spaced from and opposed to each other on outer and rear surfaces of the window plate, respectively, and connected with each other by a bridge section having a continuous hollow inner space therein. The frame member is formed by injecting into a mold cavity a relatively small amount, as compared with the volume of the mold cavity, of molten thermoplastic synthetic resin material, and by injecting compressed gas into the resin material to urge the resin material against inner surfaces of the mold defining the cavity.

16 Claims, 3 Drawing Sheets

U.S. PATENT DOCUMENTS

| | | | |
|---|---|---|---|
| 4,104,353 A | * 8/1978 | Monnet | 264/328.12 |
| 4,139,234 A | 2/1979 | Morgan | |
| 4,140,672 A | * 2/1979 | Kataoka | 264/328.12 |
| 4,234,642 A | 11/1980 | Olabisi | |
| 4,477,507 A | 10/1984 | Kunert | |
| 4,561,625 A | 12/1985 | Weaver | |
| 4,668,556 A | * 5/1987 | Hermann et al. | 52/716 X |
| 4,688,752 A | 8/1987 | Barteck et al. | |
| 4,740,150 A | * 4/1988 | Sayer | 264/572 |
| 4,781,554 A | 11/1988 | Hendry | |
| 4,824,732 A | 4/1989 | Hendry et al. | |
| 4,839,122 A | 6/1989 | Weaver | |
| 4,923,666 A | 5/1990 | Yamazaki et al. | |
| 4,984,402 A | 1/1991 | Davies | |
| 5,098,637 A | * 3/1992 | Hendry | 265/572 |
| 5,264,270 A | 11/1993 | Agrawal | |

FOREIGN PATENT DOCUMENTS

| | | | | |
|---|---|---|---|---|
| EP | 0127961 | 12/1984 | | |
| EP | 0145443 | 6/1985 | | |
| EP | 0173907 | 3/1986 | | |
| EP | 0289230 | 11/1988 | | |
| FR | 2553083 | 4/1985 | | |
| GB | 2158002 | 6/1987 | | |
| JP | 4159466 | 12/1979 | | |
| JP | 56 99817 | 8/1981 | | |
| JP | 57 1737 | 1/1982 | | |
| JP | 5714968 | 3/1982 | | |
| JP | 0170622 | * 10/1983 | | 296/93 |
| JP | 5923724 | 2/1984 | | |
| JP | 59171733 | 9/1984 | | |
| JP | 62-260845 | 11/1987 | | |
| JP | 62-268729 | * 11/1987 | | 264/511 |
| JP | 2279912 | 12/1987 | | |
| JP | 62-279912 | 12/1987 | | |
| JP | 6315711 | 1/1988 | | |
| JP | 63-188020 | * 8/1988 | | 264/516 |
| JP | 194019 | 4/1989 | | |

* cited by examiner

FIG_1
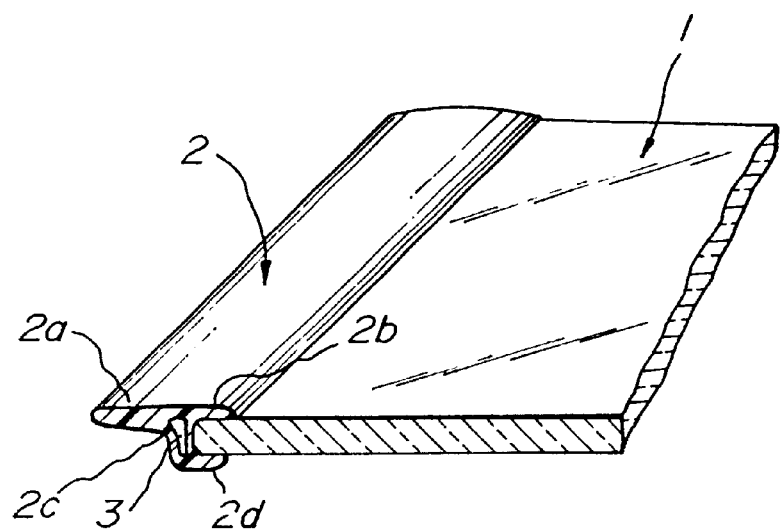
FIG_2
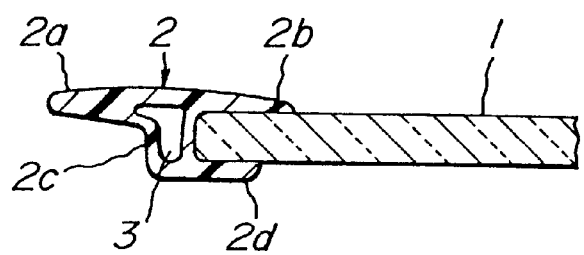

FIG_6
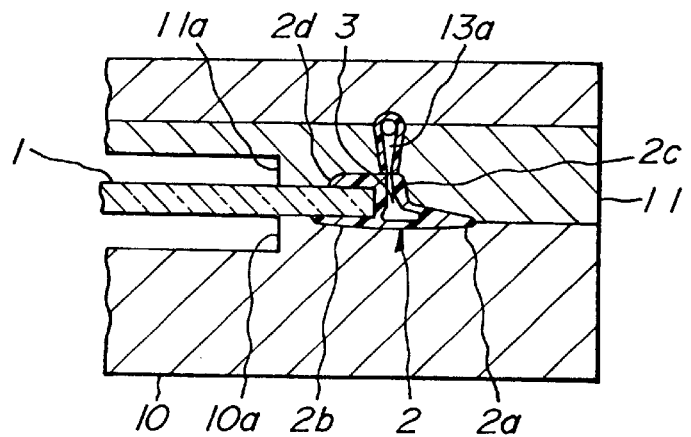
FIG_7
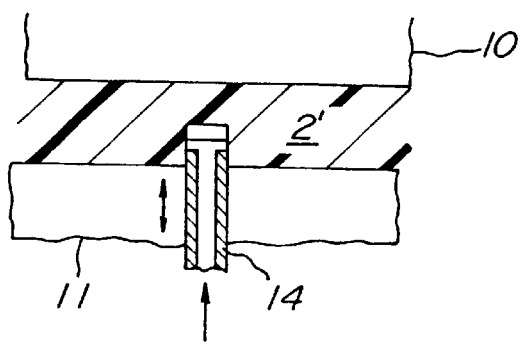
FIG_8
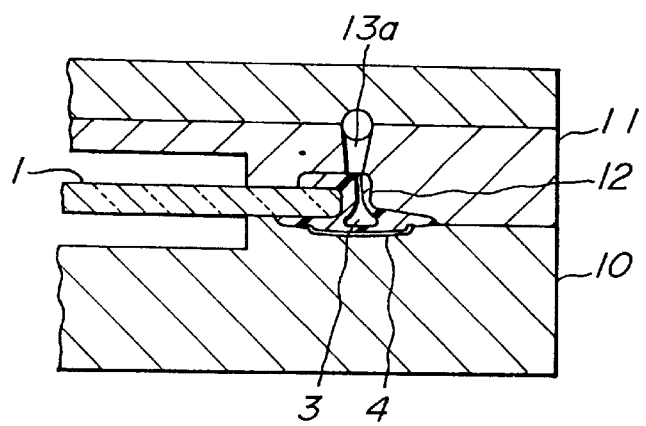

METHOD OF MANUFACTURING WINDOWS HAVING AN INTEGRAL HOLLOW BODY FRAME MEMBER

This application is a Continuation of application Ser. No. 08/047,026, filed Apr. 16, 1993 which is a Divisional of application Ser. No. 07/758,469, filed Sep. 6, 1991 which is a Continuation of application Ser. No. 07/442,627, filed Nov. 29, 1989.

BACKGROUND OF THE INVENTION

1. Field of the Invention

The present invention relates to a window for automobiles or the like, including a window plate and a frame member composed of a thermoplastic synthetic resin material and provided integrally with the window plate, and also to a method of manufacturing such windows.

2. Description of the Related Art

Automobile windows wherein a window plate is integrally provided with a frame member composed of a thermoplastic synthetic resin material is advantageous in that, since it is not necessary to prepare a window molding member as a separate component from the window plate, the number of components and assembly steps can be reduced to realize an improved manufacturing productivity in the assembly lines of automobile factories.

There is disclosed, e.g. in U.S. Pat. No. 4,139,234 and Japanese Patent Application Laid-open Publication Nos. 56-99,817 and 57-1,737, a method of manufacturing such automobile windows wherein the peripheral edge of a window plate is placed in an injection mold including upper and lower mold halves, and a molten thermoplastic synthetic resin material is injected into the cavity space between the upper and lower mold halves through at least one gate. While the above-mentioned method permits formation of an integral frame member along the edge of the window plate, a number of problems are left still unsolved, which are as follows.

First of all, thermoplastic synthetic resin material may have a relatively high viscosity during the injection into the mold cavity, which depends upon physical and/or chemical properties of the material. Then, the injection has to be carried out at an elevated temperature of the mold to lower the viscosity of the resin material and to avoid premature cooling of the resin material before it has been completely distributed within the mold cavity has to be carried at and under a relatively high injection pressure to realize a uniform distribution of the resin material throughout the entire cavity space. The elevated temperature to which the mold has to be heated necessarily requires a longer time until completion of the injection and cooling of the resin material, and makes it difficult to achieve an improved manufacturing productivity. Furthermore, the relatively high injection pressure often results in undesirable formation of burrs or flushings along the parting surface of the mold halves or results in damage to the window plate due to a higher tightening force applied from both sides by the mold halves for withstanding the injection pressure. Also, when the frame member is provided with an integral, strip-like ornamental element applied on its outer surface with clips or with the like fitting elements partly embedded in the synthetic resin material by a so-called insert-molding process, these elements may be deformed or subjected to dislocation by the injection pressure.

Secondly, the frame member placed to cool is more or less accompanied by shrinkage, thereby subjecting the window plate to a severe compression stress. Thus, when the window plate is composed of a brittle glass plate, it is not always possible to prevent formation of cracks in the window plate. Particularly, when the window plate has a surface curvature, the window plate is often subjected to a substantial bending stress, and the curved surface of the window plate undergoes an undesirable deformation. These problems are more significant when the window plate is composed of a transparent synthetic resin material with a relatively lower structural rigidity than inorganic glass. Moreover, the frame member is generally formed to surround the edge of the window plate from both sides thereof, and thus includes a substantially U-shaped cross-sectional portion formed of relatively thin lip and web sections on the outer and rear surfaces of the window plate, respectively, and a relatively thick bridge section for connecting the lip and web sections with each other. The material thickness of the frame member with such a sudden change results in a retarded cooling rate of the thick bridge section and results in a resultant formation of sink mark on its outer surface.

Finally, in addition to the above, the window A plate is accompanied by certain dimensional fluctuation which are due to practical difficulties in preparing window plates of a satisfactorily constant shape, while the volume of the mold cavity remains always constant. An optimum amount of thermoplastic synthetic resin material to be injected into the mold cavity thus varies for each window plate, depending upon the length with which the window plate is inserted into the mold cavity. From practical viewpoint, however, it is not very appropriate to individually adjust the amount of the resin material for each shot, and it has thus been a general practice to inject into the mold cavity a substantially constant amount of resin material, without regard to dimensional fluctuation of the window plate at all. It is of course that injection of an excessive amount of resin material into the mold cavity, too, results in formation of burrs or flashings along the parting surface of the mold halves, while insufficiency in the injected amount of the resin material gives rise to a undesirable tendency of the sink mark to appear on the outer surface of the frame member.

SUMMARY OF THE INVENTION

It is therefore a primary object of the present invention to provide a novel and improved window for automobiles or the like, which includes a frame member formed integrally with the window plate and composed of a thermoplastic synthetic resin material and which can be readily manufactured without the above-mentioned drawbacks.

Another object of the present invention is to provide a novel and improved method of manufacturing windows for automobiles or the like, including a frame member formed integrally with the window plate and composed of a thermoplastic synthetic resin material, by which the windows can be readily manufactured without the above-mentioned drawbacks.

According to one aspect of the present invention, there is provided a window for automobiles or the like, including a window plate, and a frame member which is composed of a thermoplastic synthetic resin material and formed into an integral structure with the window plate along at least one edge thereof, wherein said frame member includes a substantially U-shaped cross-sectional portion comprising lip and web sections which are spaced from and opposed to each other on outer and rear surfaces of the window plate, respectively, and a bridge section connecting the lip and web sections with each other, wherein said bridge section has a longitudinally continuous hollow inner space.

According to another aspect of the present invention, there is provided a method of manufacturing windows of the above-mentioned structure, comprising the steps of:

(A) preparing a window plate;

(B) preparing a mold having surfaces defining a cavity of a predetermined volume therein, said cavity being of a configuration which corresponds to said frame member;

(C) placing at least one edge of the window plate in the mold cavity;

(D) injecting into the mold cavity a predetermined amount of thermoplastic synthetic resin material in its molten state, said amount being smaller than said volume of the cavity;

(E) injecting compressed gas into the synthetic resin material in said cavity to urge said synthetic resin material against said surfaces of the mold defining the cavity; and (F) placing said synthetic resin material under cooling and solidification in said mold cavity, thereby to form a frame member which is integral with said window plate along at least one edge thereof, and which includes a substantially U-shaped cross-sectional portion formed of lip and web sections which are spaced from and opposed to each other on outer and rear surfaces of the window plate, respectively, and a bridge section connecting the lip and web sections with each other and having a longitudinally continuous hollow inner space.

The window according to the present invention, including a frame member which is integral with the window plate and whose bridge section connecting the lip and web sections with each other has a longitudinally continuous hollow inner space, and serves to effectively protect the window plate from damages or deformation upon shrinkage of the frame member after it has been formed, without being subjected to severe compression and/or bending stress, due to the deformability of the hollow inner space in the bridge section of the frame member.

Furthermore, in the method of manufacturing the windows according to the present invention, the frame member is formed by injecting into the mold cavity a relatively small amount of thermoplastic synthetic resin material as compared with the volume of the cavity and by injecting the compressed gas into the synthetic resin material in the cavity. Thus, even a synthetic resin material with a relatively high viscosity can be uniformly distributed throughout the cavity without application of a higher injection pressure as is the case in conventional injection process. Moreover, the synthetic resin material in the mold cavity can be sufficiently urged by the injected compressed gas against the surfaces of the mold defining the cavity to realize a desired configuration of the frame member without an undesirable sink mark.

BRIEF DESCRIPTION OF THE DRAWINGS

FIG. 1 is a fragmentary perspective view, partly in section, of an automobile window according to one embodiment of the present invention;

FIG. 2 is a cross-sectional view of the window;

FIGS. 3 to 6 are sectional views showing successive steps of the method for manufacturing the window according to the present invention;

FIG. 7 is a fragmentary sectional view showing another example of the mold which includes a gas injection tube separately from the gate; and FIG. 8 is a fragmentary sectional view similar to FIG. 4 and showing that the present invention can be applied to manufacture windows whose frame is provided with a strip-like ornamental portion on its outer surface.

DETAILED EXPLANATION OF THE PREFERRED EMBODIMENTS

Figure 3:
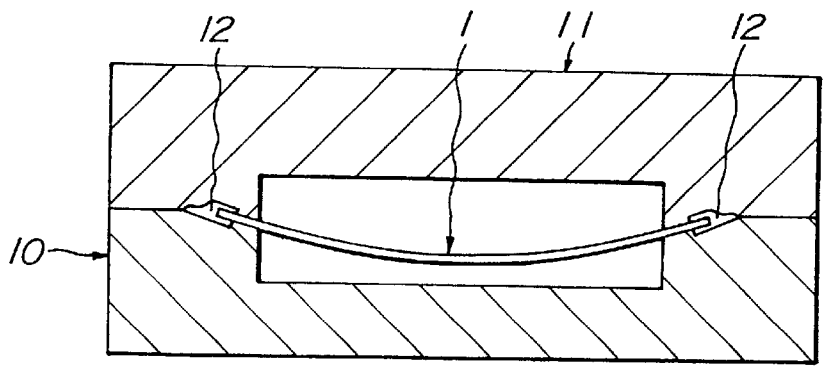

The present invention will now be explained in further detail, by referring to some preferred embodiments shown in the accompanying drawings.

There is shown in FIGS. 1 and 2 an automobile front window according to one embodiment of the present invention, which includes a window plate 1 and a frame member 2 formed into an integral structure with the window plate 1 along upper and side edges thereof. The window plate 1 is composed of an inorganic glass or a transparent synthetic resin such as acrylic resin or polycarbonate resin and may have a predetermined two or three dimensional surface curvature, as can be seen from FIG. 3. The frame member 2, in turn, is composed of an appropriate thermoplastic synthetic resin material including general purpose resins such as polyvinylchloride resin, polyethylene resin, polystyrene resin and ABS resin, as well as so-called engineering plastic materials such as polyamide resin or modified PPO resin. The frame member 2 is of a unitary structure and includes first and second lip sections 2a, 2b, a bridge section 2c and a web section 2d. The first lip section 2a is adapted to engage with a predetermined location of an automobile body panel (not shown). The second lip section 2b and the web section 2d are spaced from and opposed to each other on the outer and rear surfaces of the window plate 1, and connected with each other by the bridge section 2c. Thus, the lip section 2b, the bridge section 2c and the web section 2d form a substantially U-shaped cross-sectional portion of the frame member 2. The bridge section 2c is formed, according to the present invention, with a longitudinally continuous hollow space 3 therein.

With the above-mentioned structure of the window according to the present invention, the frame member 2 includes a bridge section 2c with a longitudinally continuous hollow inner space 3 and is thus capable of adequately compensating for the compression force arising from thermal shrinkage of the frame member 2 after it has been formed, due to the deformability of the hollow inner space 3; hence, it is readily possible to protect the window plate 1 from damage or deformation.

The window of the above-mentioned structure can be manufactured by a method according to the present invention, which includes the steps to be particularly described hereinafter.

The method according to the present invention begins with the preparation of a window plate 1 which includes upper and side edges 1a, 1b and 1c to be formed with the frame member 2. The method also makes use of a mold comprising a cavity plate 10 and a core plate 11 adapted to cooperate with each other to define a cavity 12 of a configuration which substantially corresponds to the frame member 2 to be formed. For introducing thermoplastic synthetic resin material into the cavity 12 in the mold, the cavity 12 is preferably provided with a plurality of gates 13a, 13b, 13c corresponding to the upper and side edges 1a, 1b, 1c of the window plate 1, respectively. When, on the other hand, only one edge of the window plate 1 is formed with the frame member 2, provision of a single gate in the cavity 12 may be sufficient to allow introduction of a required amount of thermoplastic synthetic resin material into the cavity 12. The gates 13a, 13b, 13c are arranged at those regions of the mold which correspond to the bridge section 2c of the frame member 2.

The window plate 1 is applied with adhesive material layers along the edges 1a, 1b, 1c to be formed with the frame member 2 on both outer and rear surface regions thereof and is then mounted on the cavity plate 10, preferably, with its concave rear side oriented vertically upwardly as shown in FIG. 3, to facilitate the positioning of the window plate 1. Subsequently, the cavity plate 10 and the core plate 11 are tightly connected with each other, with the window plate 1 clamped between the two plates 10, 11 and the edges 1a, 1b, 1c projecting into the cavity 12.

Figure 4:
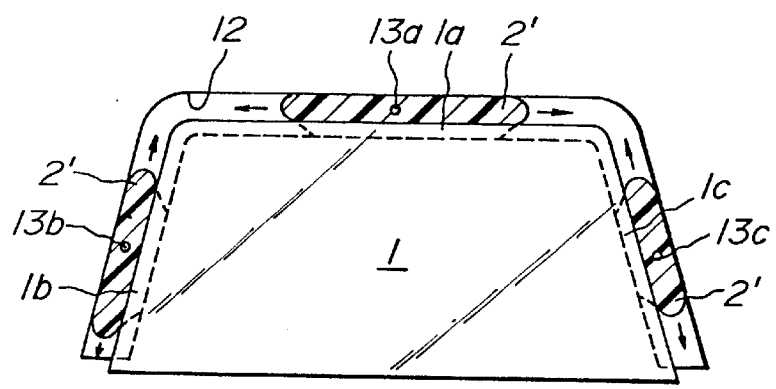
Figure 5:
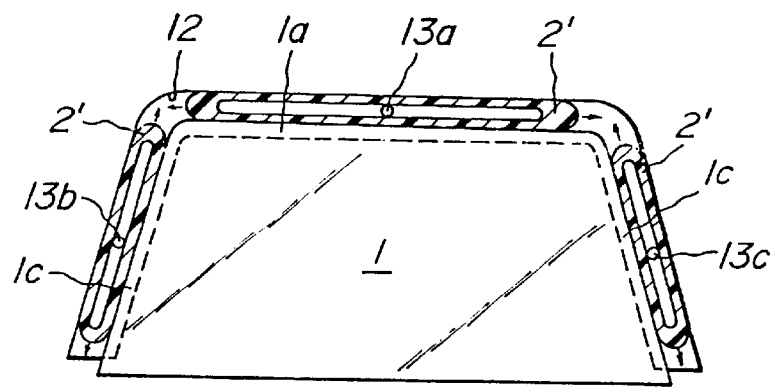

In the next step, as particularly shown in FIGS. 4–6, a predetermined amount of molten thermoplastic synthetic resin material 2' is injected into the cavity 12 of the mold through the gates 13a, 13b, 13c. The total amount of the resin material 2' to be injected is smaller than the volume of the cavity 12, and is preferably about 80–90% of the cavity volume. The resin material 2' injected into the cavity 12 begins to flow along the edges 1a, 1b, 1c of the window plate 1 on both sides of each gate 13a, 13b, 13c.

Subsequently to the injection of the synthetic resin material 2' into the cavity 12, or simultaneously therewith as the case may be, compressed gas under the pressure on the order of several 10 kg/cm$^2$, which may be nitrogen or the like inert gas or air, is injected from the gates 13a, 13b, 13c into the synthetic resin material 2', preferably by using the injection nozzles of an injection machine (not shown). As shown in FIGS. 5 and 6, the compressed gas serves to achieve a uniform distribution of the resin material 2' throughout the entire cavity 12, while at the same time urging the resin material 2' against the inner surfaces of the cavity 12, thereby forming the hollow inner space 3 in the resin material 2'. On this occasion, so-called weld lines formed by merger and fusion of two flows of resin material 2' from neighboring gates 13a, 13b, 13c are formed at the corner regions of the window plate 1 between the upper edge la and the side edges 1b, 1c. The pressure of the compressed gas is maintained until completion of the cooling and solidification of the resin material 2' in the cavity 12, after which the cavity plate 10 and the core plate 11 are disengaged from each other to take out from the cavity 12 the window plate 1 with integral frame member 2 having a longitudinally continuous hollow inner space 3.

In the above-mentioned method according to the present invention, the thermoplastic synthetic resin material 2' is applied with the pressure of the compressed gas on the order of several 10 kg/cm$^2$, i.e. on a pressure level which is significantly lower than pressure on the order of several 100 kg/cm$^2$ for injecting resin material into a mold cavity in a conventional injection molding process. The low pressure of the resin material 2' effectively protects the window plate 1 from damage, and prevents formation of burrs or flushings due to the leakage of the resin material 2' along the parting surface of the cavity plate 10 and the core plate 11. Furthermore, the mold need not withstand a higher inner pressure, it may be a less expensive and less complicated structure.

Moreover, the injection of the compressed gas into the resin material 2' is particularly advantageous in that, not only formation of undesirable sink mark can be avoided, but also the resin material 2' can be go efficiently cooled by the compressed gas also from the inside in a relatively short time to substantially improve the manufacturing productivity.

In order to achieve a satisfactory distribution of the resin material 2' uniformly throughout the cavity 12 within the mold, the cavity is preferably constructed such that the compressed gas forms the hollow inner space 3 of an equivalent cross-sectional diameter of 3.5 mm or more. This is particularly advantageous when use is made of a resin material with a resistively small melt index, and hence with a relatively high viscosity.

In another embodiment of the method according to the present invention, as shown in FIG. 7, the compressed gas is injected into the resin material 2' within the cavity 12 by using at least one injection tube 14 which is reciprocably provided for the core plate 11. The injection tube 14 may be moved into the resin material 2' after completion of injection of the latter.

The present invention may also be applied to a window whose frame member 2 which is provided with an ornamental portion 4 on its outer surface. The ornamental portion 4 may be composed of a metal strip, which is arranged on the cavity plate 10 when placing the window plate 1 in the mold, as shown in FIG. 8. On this occasion, the ornamental portion 4 is not applied with high injection pressure, so that it can be readily maintained in position by relatively simple means, e.g. a vacuum suction device, without being subjected to dislocation thereof. The ornamental portion 4 applied with a low pressure can be effectively protected from deformation or damages.

It will be readily appreciated from the foregoing description that the window according to the present invention includes an integral frame member with a longitudinally continuous hollow inner space which serves to protect the window plate from damages while at the same time avoiding formation of a sink mark on the outer surface of the frame member. Furthermore, the method of manufacturing the windows according to the present invention ensures that even a synthetic resin material with a relatively high viscosity can be uniformly distributed throughout the cavity without application of a higher injection pressure and that the synthetic resin material in the mold cavity can be sufficiently urged by the compressed gas against the surfaces of the mold defining the cavity to realize a desired configuration of the frame member without an undesirable sink mark.

While the present invention has been described with reference to certain specific embodiments presented by way of examples only, those skilled in the art will readily appreciate that various modifications and/or variations may be made without departing from the scope of the invention.

What is claimed is:

1. A method of manufacturing windows, including a window plate and a frame member which is composed of a thermoplastic synthetic resin material and formed integrally with the window plate along at least one edge thereof, said frame member including a lip section and a web section which are spaced from and opposed to each other on outer and rear surfaces of the window plate, respectively, and further including a bridge section connecting the lip and web sections with each other, wherein said method comprises the steps of:

(A) placing at least one edge of the window plate between a cavity plate and a core plate of an injection mold, and connecting the cavity plate and the core plate to each other with said at least one edge of the window plate clamped therebetween, to define a mold cavity, having a volume which corresponds to the frame member along the clamped edge of the window plate;

(B) pressurizing and injecting a predetermined amount of a molten thermoplastic synthetic resin material into the mold cavity, said predetermined amount being sufficient to form a frame member with a continuous hollow inner space;

(C) injecting into the synthetic resin material within said mold cavity a compressed gas under a predetermined pressure, from that side of the core plate which forms part of the web section of the frame member, thereby causing the synthetic resin material to flow along the clamped edge of the window plate forcing the resin against the window plate while forming a continuous hollow inner space within the synthetic resin material, said hollow space acting to reduce the pressure of the resin material against the window plate;

(D) maintaining said pressure of the compressed gas thereby urging the synthetic resin material against surfaces of the mold defining the mold cavity and against outer and rear surfaces of the window plate along the clamped edge thereof, while placing the synthetic resin material under cooling and solidification conditions in the mold cavity; and (E) separating the cavity plate and the core plate from each other, and removing from the injection mold the window plate integrally provided with the frame member along said at least one edge thereof.

2. The method as claimed in claim 1, wherein the synthetic resin material is injected into the mold cavity through at least one gate, and wherein the compressed gas is injected into the synthetic resin material within said mold cavity through said gate.

3. The method as claimed in claim 1, wherein the synthetic resin material is injected into the mold cavity through at least one gate, and wherein the compressed gas is injected into the synthetic resin material within said mold cavity through at least one injection tube.

4. The method as claimed in claim 1, wherein the compressed gas is injected into the synthetic resin material within said mold cavity through a plurality of inlets.

5. The method as claimed in claim 4, wherein said window plate has a first edge and a second edge and a corner edge therebetween, and wherein said inlets are provided for the injection mold such that the compressed gas injected into the synthetic resin material from adjacent inlets causes two flows of the synthetic resin material to merge and fuse with each other thereby forming a weld line at the corner edge of the window plate.

6. The method as claimed in claim 1, wherein the window plate comprises a glass plate.

7. The method as claimed in claim 1, wherein the window plate comprises a transparent synthetic resin material.

8. The method of claim 1, wherein said predetermined amount is a volume of synthetic resin material smaller than the volume of said mold cavity.

9. A method of manufacturing windows, including a window plate and a frame member which is composed of a thermoplastic synthetic resin material and formed integrally with the window plate along at least one edge thereof, said frame member including a lip section and a web section which are spaced from and opposed to each other on outer and rear surfaces of the window plate, respectively, and further including a bridge section connecting the lip and web sections with each other, and an ornamental element arranged on outer surface of the lip section, wherein said method comprises the steps of:

(A) placing at least one edge of the window plate between a cavity plate and a core plate of an injection mold, with the ornamental element placed on the cavity plate, and connecting the cavity plate and the core plate to each other with said at least one edge of the window plate clamped therebetween, to define a mold cavity having a volume which corresponds to the frame member along the clamped edge of the window plate;

(B) pressurizing and injecting a predetermined amount of a molten thermoplastic synthetic resin material into the mold cavity, said predetermined amount being sufficient to form a frame member with a continuous hollow inner space;

(C) injecting into the synthetic resin material within said mold cavity a compressed gas under a predetermined pressure, from that side of the core plate which forms part of the web section of the frame member, thereby causing the synthetic resin material to flow along the clamped edge of the window plate forcing the resin against the window plate while forming a continuous hollow inner space within the synthetic resin material, said hollow space acting to reduce the pressure of the resin material against the window plate;

(D) maintaining said pressure of the compressed gas thereby urging the synthetic resin material against surfaces of the mold defining the mold cavity and against outer and rear surfaces of the window plate along the clamped edge thereof, while placing the synthetic resin material under cooling and solidification conditions in the mold cavity; and (E) separating the cavity plate and the core plate from each other, and removing from the injection mold the window plate integrally provided with the frame member along said at least one edge of the window plate, said frame member having the ornamental element on the outer surface of the lip section.

10. The method as claimed in claim 9, wherein the synthetic resin material is injected into the mold cavity through at least one gate, and wherein the compressed gas is injected into the synthetic resin material within said mold cavity through said gate.

11. The method as claimed in claim 9, wherein the synthetic resin material is injected into the mold cavity through at least one gate, and wherein the compressed gas is injected into the synthetic resin material within said mold cavity through at least one injection tube.

12. The method as claimed in claim 9, wherein the compressed gas is injected into the synthetic resin material within said mold cavity through a plurality of inlets.

13. The method as claimed in claim 12, wherein said window plate has a first edge, a second edge and a corner edge therebetween, and wherein said inlets are provided for the injection mold such that the compressed gas injected into the synthetic resin material from adjacent inlets causes two flows of the synthetic resin material to merge and fuse with each other thereby forming a weld line at the corner edge of the window plate.

14. The method as claimed in claim 9, wherein the window plate comprises a glass plate.

15. The method as claimed in claim 9, wherein the window plate comprises a transparent synthetic resin material.

16. The method of claim 9, wherein said predetermined amount is a volume of synthetic resin material smaller than the volume of said mold cavity.

\* \* \* \* \*